R. N. BAYLIS.

GAS PRESSURE REGULATOR.

APPLICATION FILED SEPT. 28, 1915.

1,183,844.

Patented May 23, 1916.

2 SHEETS—SHEET 1.

Robert N. Baylis. Inventor

By his Attorneys

Mitchell & Allen.

R. N. BAYLIS.
GAS PRESSURE REGULATOR.
APPLICATION FILED SEPT. 28, 1915.

1,183,844. Patented May 23, 1916.
2 SHEETS—SHEET 2.

Robert N. Baylis. Inventor
By his Attorneys
Mitchell & Allyn.

UNITED STATES PATENT OFFICE.

ROBERT N. BAYLIS, OF CALDWELL, NEW JERSEY.

GAS-PRESSURE REGULATOR.

1,183,844. Specification of Letters Patent. Patented May 23, 1916.

Application filed September 28, 1915. Serial No. 53,131.

*To all whom it may concern:*

Be it known that I, ROBERT N. BAYLIS, a citizen of the United States of America, residing at Caldwell, New Jersey, have invented a new and useful Gas-Pressure Regulator, of which the following is a specification.

My invention relates to fluid pressure regulators or governors adapted to control the pressure in the service main beyond the regulator.

The improvements set forth herein relate more particularly to that type of regulator set forth in my former Patent No. 1,062,138 of May 20, 1913, to which reference may be had for a description of the main parts and their operation.

The object of the present invention is to provide improved features of construction which will greatly facilitate the installation of the apparatus and which will permit the apparatus to be taken down for the purposes of repair, replacement or readjustment of parts, should occasion therefor arise.

Figure 1:
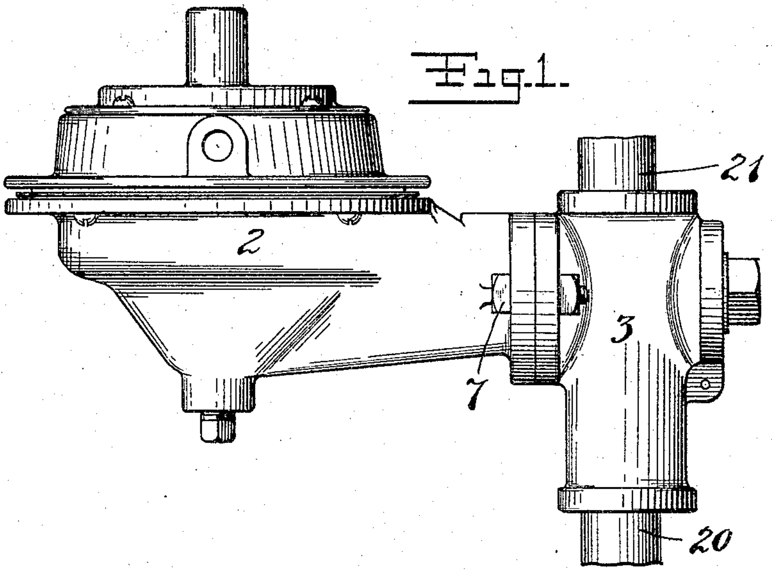
Figure 2:
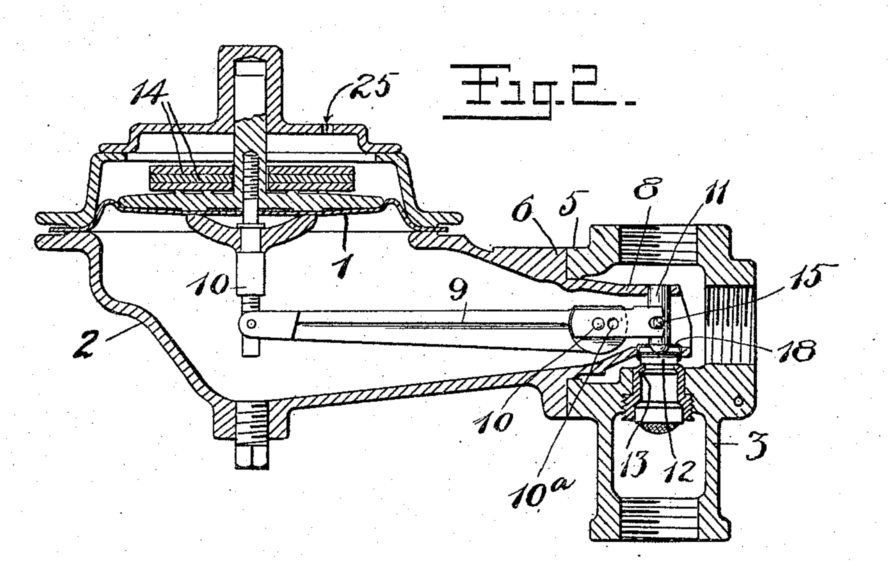
Figure 3:
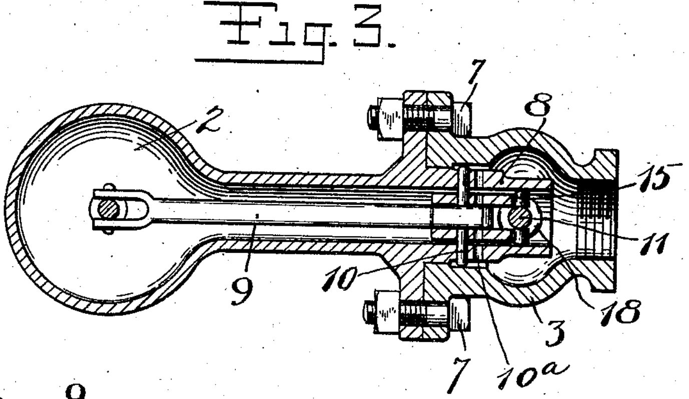
Figure 4:
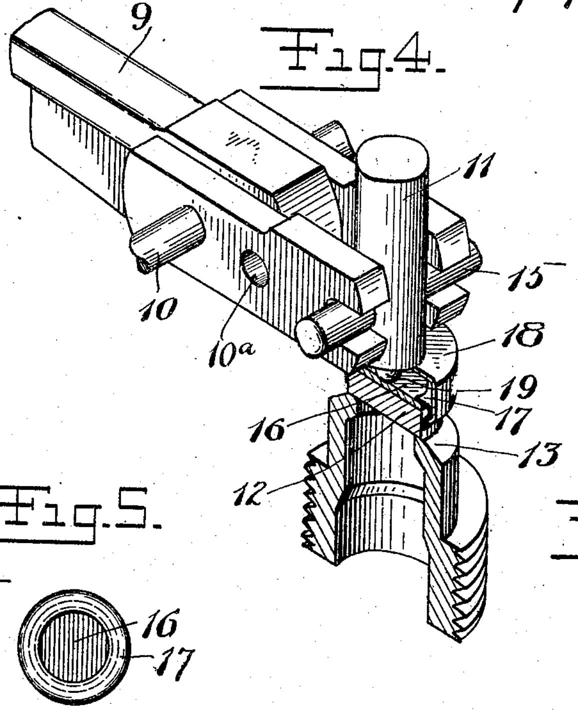
Figure 5:
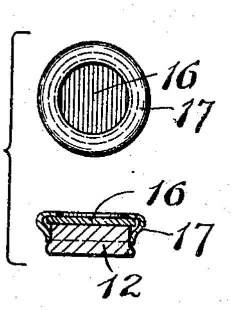
Figure 6:
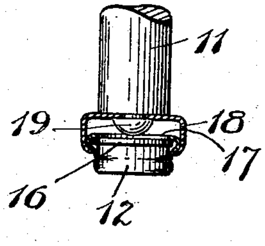

The above and other advantages will be apparent to the mechanic skilled in the art from a reading of the following description, and an examination of the accompanying drawing:

In the drawings: Figure 1 is a side elevation of my improved regulator. Fig. 2 is a cross section thereof on a vertical plane. Fig. 3 is a cross section on a horizontal plane. Fig. 4 is a relatively enlarged perspective view of certain details, partly in section. Figs. 5 and 6 are detailed views.

The main parts of the regulator comprise a diaphragm 1 mounted in a suitable diaphragm housing 2, said diaphragm operating to control a valve arranged in the passage to be controlled. In this case I have provided an improved connection between the diaphragm and the valve, as will later be seen.

3 represents a pipe head through which the fluid is to pass. This head is provided with a suitable boss or shouldered portion 5 which constitutes a seat. The diaphragm housing is provided with a suitable shouldered portion 6 which is arranged to take against the seat 5, and to which it may be securely clamped, as by bolts 7—7. Projecting forwardly beyond the shoulder 6 is a hollow extension 8 which is arranged to project well into the passage through the head 3.

9 is a lever arm connected by a suitable link 10 to the diaphragm 1. This lever 9 is pivoted at 10 in the extension 8, while at its outer end, it is suitably connected to a valve stem 11 which is guided in suitable passages in the extension 8. This valve stem 11 is arranged to coöperate with the valve 12, which in turn coöperates with a valve seat 13 carried by the head 3 so as to control the passage of gas therethrough. As the pressure underneath the diaphragm 1 tends to increase, the diaphragm will be lifted so as to close the valve to the proper degree to control the pressure in the service pipe. The diaphragm may be caused to operate in the valve opening direction by any suitable means, but I preferably provide weights 14—14. The forward end, or outer end of the lever 9, is formed as a yoke, and is preferably slotted horizontally to receive a pin 15 which passes transversely through the valve stem 11. By my improved arrangement the side walls of the extension 8 serve to hold the pin 15 from endwise displacement. The pivot pin 10 for the lever is held from endwise displacement by the inside wall of the head 3 as best seen in Fig. 3. The valve 12 is preferably formed of leather or some other suitable material capable of proper coöperation with the seat 13. When formed of a yielding material such as leather, I preferably provide the valve with a stiff metal disk-like backing 16 which may be secured to the back of the valve 12 in any suitable manner, as by a clenching ring 17, said ring preferably forming a flange. The valve stem 11 carries at its lower end, what I may term a valve carrying cage 18 which is designed to receive and loosely hold the valve 12 directly below the stem as best seen in Fig. 6. The valve stem is preferably provided with a central bearing 19 arranged to engage the back of the valve at about its center, so that said valve may be self adjusting relatively to its seat 13. Assuming it should be desirable to take down the regulator for the purpose of inserting a new valve, or to replace worn parts, it is merely necessary to remove the bolts 7—7 whereupon the diaphragm housing and all of the associated parts may be bodily removed as a unit, giving at once free and easy access to the aforesaid parts.

The head 3 when the apparatus is installed may remain as a fixed part of the pipe system, the supply pipe entering as at 20, the service pipe leaving the head as at 21.

In the assembling of the parts as shown, it may be assumed that the device is adapted to control relatively low pressures in the main or supply. By my improvement, however, it is exceedingly easy to adapt the apparatus to the control of higher pressures. To that end I provide one or more pin passages $10^a$ through the lever nearer to the valve stem than the pin passage in which the pin 10 is shown as located in Fig. 2. It will also be noted that the valve seat 13 is removable, it being shown as screwed into place. In the event it is desired to adjust for higher pressures, the pin 10 would be moved into the pin passage $10^a$ which extends, of course, not only through the lever 9, but also through the housing extension 8, and a valve seat 13 having a smaller passage would be substituted for the one shown. Thus, the apparatus is quickly and easily adjustable.

In referring to the fulcrum 10 as a pin, it should be understood that I am using that term generically, and intend to include any equivalent of a pin in this connection.

The diaphragm housing above the diaphragm will, of course, be provided with a suitable vent as indicated at 25 preferably of an appropriate size to give a dash-pot action so as to prevent noticeable fluttering of the diaphragm.

What I claim is:

1. In a fluid pressure regulator, a pipe receiving head, a diaphragm housing removable therefrom, said housing having an extension projecting into said head, a valve within the head and guided by said extension, a diaphragm in said housing, and means operatively connecting the diaphragm with said valve.

2. In a fluid pressure regulator, a pipe receiving head, a diaphragm housing removable therefrom, said housing having an extension projecting into said head, a valve within the head and guided by said extension, a diaphragm in said housing, means operatively connecting the diaphragm with said valve, and means for loosely connecting said valve to said operating means whereby said valve may be self adjusting relatively to its seat.

3. In a fluid pressure regulator, a pipe receiving head, a diaphragm housing detachably secured to said head, an extension from said housing arranged to project into said head, a valve seat carried by said head and having a passage therethrough, a valve adapted to said seat and having a valve stem guided in said extension, a lever pivotally mounted in said extension, one end of said lever being operatively connected to said diaphragm, and means for operatively connecting the other end of said lever to said stem.

4. In a fluid pressure regulator, a pipe receiving head, a diaphragm housing detachably secured to said head, an extension from said housing arranged to project into said head, a valve seat carried by said head and having a passage therethrough, a valve adapted to said seat and having a valve stem guided in said extension, a lever pivotally mounted in said extension, one end of said lever being operatively connected to said diaphragm, and means for operatively connecting the other end of said lever to said stem, said means comprising a pin, the side walls of said extension operating to hold said pin in place.

5. In a fluid pressure regulator, a pipe receiving head, a diaphragm housing detachably secured to said head, an extension from said housing arranged to project into said head, a valve seat carried by said head and having a passage therethrough, a valve adapted to said seat and having a valve stem guided in said extension, a lever pivotally mounted in said extension, one end of said lever being operatively connected to said diaphragm, and means for operatively connecting the other end of said lever to said stem, the side walls of said head serving to hold the pivot pin for the lever in place.

ROBERT N. BAYLIS.

Copies of this patent may be obtained for five cents each, by addressing the "Commissioner of Patents, Washington, D. C."